(No Model.)
J. W. CHENEY.
HARNESS ATTACHMENT.
No. 351,851. Patented Nov. 2, 1886.
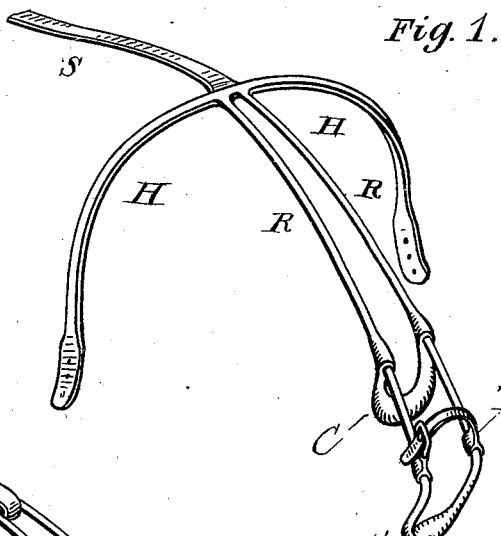
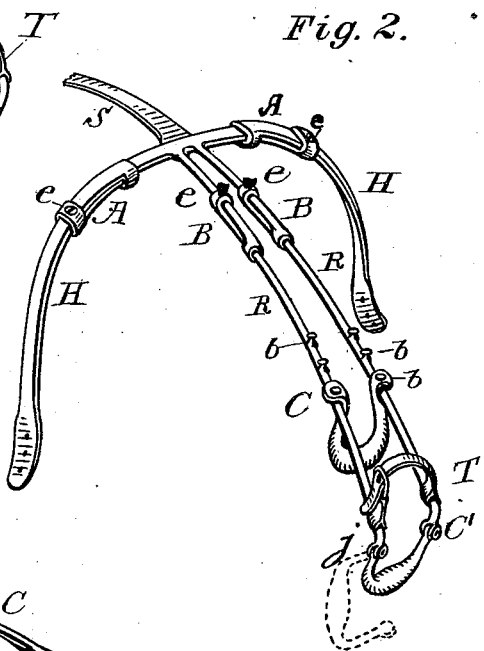
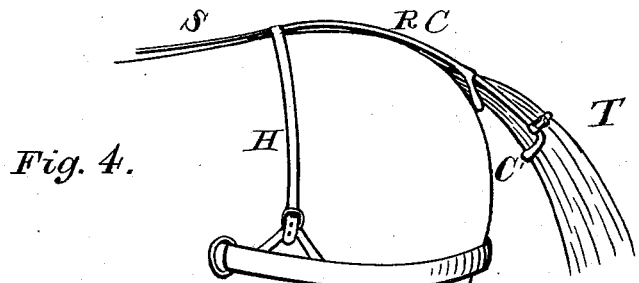

UNITED STATES PATENT OFFICE.

JOSEPH W. CHENEY, OF PALMER, MASSACHUSETTS.

HARNESS ATTACHMENT.

SPECIFICATION forming part of Letters Patent No. 351,851, dated November 2, 1886.

Application filed August 12, 1886. Serial No. 210,704. (No model.)

*To all whom it may concern:*

Be it known that I, JOSEPH W. CHENEY, of Palmer, Hampden county, State of Massachusetts, have invented a Harness Attachment, of which the following is a specification.

My invention consists, primarily, in the combination, with a harness, of a frame-work attached thereto for supporting or holding the tail of an animal in such a manner as to control its position and prevent or limit its switching.

In the accompanying drawings, Figures 1, 2, and 3 show perspective views of different forms of my invention. Fig. 4 shows my invention as applied to an animal.

Referring to Fig. 1, the rods R R, of iron or like suitable material, are covered with leather, and pass down within the hip-straps H H, and are secured to the back-strap S. A crupper, C, of ordinary construction, is attached thereto, and an additional crupper-like appendage, C', connects between the rods R R.

When a harness with this attachment is placed upon a horse and the tail of the animal is passed through crupper C, it will fall between the rods R R into the crupper-like part C', and may then be secured in that position by the strap T. The tail of the animal, being thus inclosed and secured in the frame-work thus formed, cannot be moved by the animal beyond the range of movement desired and provided for in the adjustment given by the strap T, crupper C, and piece C'. The straps H H being stiffened and the rods R R being of suitable thickness, the animal thus equipped can be prevented from switching its tail over the lines or from raising its tail beyond a predetermined degree, with obvious advantages.

Horses that have an acquired habit of carrying their tails to one side or in any other undesirable manner may be prevented from so carrying their tails by the use of my invention.

Fig. 2 shows the hip-straps H H adjustable at A A, and the rods R R adjustable at B B by the sliding of these parts, which may be secured when in desired position by the screws *e e*. Other means of adjusting my harness attachment to fit horses of varying size are obvious. The crupper C may be adjusted in its location upon the rods R R by a series of buttons, *b b*.

In addition to the mode of adjusting the harness attachment shown in Fig. 2, and described, the hip-straps, crupper, and other parts can be lengthened and shortened in the ordinary manner. The crupper-like piece C' may be jointed at *j*, or a strap may be employed for the crupper C and the crupper-piece C'. Instead of the rods R R being interlocked, as shown at B B, the rods may be adjustable by a telescopic-like joint.

Fig. 3 shows the rods R R without the hip-straps H H when it is desired to secure a horse's tail in position rather than to prevent switching.

Fig. 4 shows the crupper C, crupper-piece C', strap T, and rods R R upon the tail of a horse, and held from rocking by the rigid hip-straps H H, as described.

It is not necessary that the hip-straps H H should be attached to a breeching, as shown; but they may be a suitable length, and lie over the hips of the animal.

The back-strap S may be made rigid to prevent rocking, and the hip-straps be dispensed with. A single rod or strap of rigid material may be employed in place of rods R R, but the form shown is preferable.

When the back-strap S is made rigid to prevent rocking, I connect it to the saddle by an easily-movable joint, loop, or link to allow motion between the said strap and saddle up and down, but not laterally.

What I claim is—

1. The combination, with a harness, of the frame-work consisting of rods R R, the crupper C, the crupper-piece C', the strap T, and the hip-straps H H, or their described equivalents, the whole arranged and operating substantially as and for the purpose set forth.

2. The combination, with a harness, of a frame-work consisting of rods R R, the crupper C and C' beneath the tail of the animal, a strap, T, passing over the tail, and rigid straps H H, or their described equivalent, for preventing rocking, substantially as set forth.

JOSEPH W. CHENEY.

Witnesses:
L. E. MOORE,
WALDEMAR POTTER.